United States Patent [19]
Koike et al.

[11] Patent Number: 5,109,371
[45] Date of Patent: Apr. 28, 1992

[54] MANUAL SIMPLIFIED ACOUSTIC PLAYBACK APPARATUS

[76] Inventors: Eishi Koike, 12-26, Higashi-rinkan 6-chome, Sagamihara-shi, Kanagawa-ken; Hitoshi Ishii, Sunrise-Naruse 101, 2-16-8, Narusega-Oka, Machida-shi, Tokyo, both of Japan

[21] Appl. No.: 353,747

[22] Filed: May 17, 1989

[30] Foreign Application Priority Data

May 17, 1988 [JP] Japan .................. 63-120189

[51] Int. Cl.$^5$ .................................. A63H 3/33
[52] U.S. Cl. ........................... 369/63; 369/68; 369/264; 369/271
[58] Field of Search ............ 369/63, 67, 68, 253, 369/264, 271

[56] References Cited

U.S. PATENT DOCUMENTS

| | | | |
|---|---|---|---|
| 1,341,102 | 5/1920 | Belknap | 369/63 X |
| 2,978,836 | 4/1961 | Kato | 369/63 X |
| 3,073,605 | 1/1963 | Mennie | 369/63 |
| 3,844,570 | 10/1974 | Evers | 369/264 |
| 4,192,514 | 3/1980 | Ohno | 369/67 |
| 4,439,851 | 3/1984 | Kiguchi | 369/264 |
| 4,481,619 | 11/1984 | Oozeki | 369/264 X |

FOREIGN PATENT DOCUMENTS

| | | | |
|---|---|---|---|
| 0288289 | 10/1988 | European Pat. Off. | 369/264 |
| 6329594 | 8/1986 | Japan . | |
| 0236176 | 10/1987 | Japan | 369/264 |

Primary Examiner—Benjamin R. Fuller
Assistant Examiner—Randy W. Gibson
Attorney, Agent, or Firm—Weintraub, DuRoss & Brady

[57] ABSTRACT

An axis of a frictional driving wheel is supported at opposite ends thereof by bearings provided on the bottom of a casing. Within the casing is a turn table slidably and rotatably mounted on a center shaft. The turn table carries a sound recording disk located beneath a stylus and tone arm assembly pivotable in the plane of the recording disk. When the frictional driving wheel is depressed against a floor and is made to travel over the floor, a peripheral portion of the frictional driving wheel is brought into contact with the lower surface of the turn table thereby to bring the disk and stylus into contact and turn the disk record. The turn table unit includes a buffer spring provided between the disk record and the turn table to maintain an appropriate stylus force even when the turn table unit is pushed into the stylus excessively by the movement of the frictional driving wheel.

16 Claims, 3 Drawing Sheets

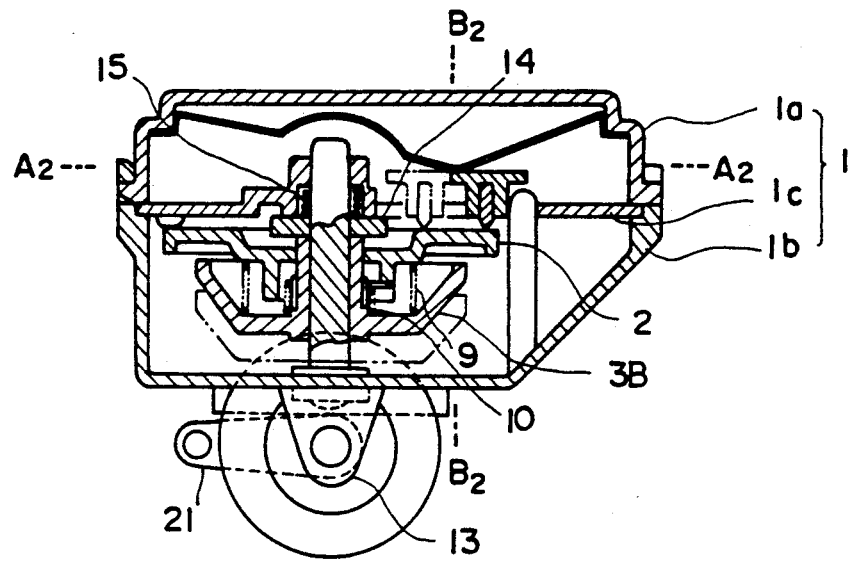
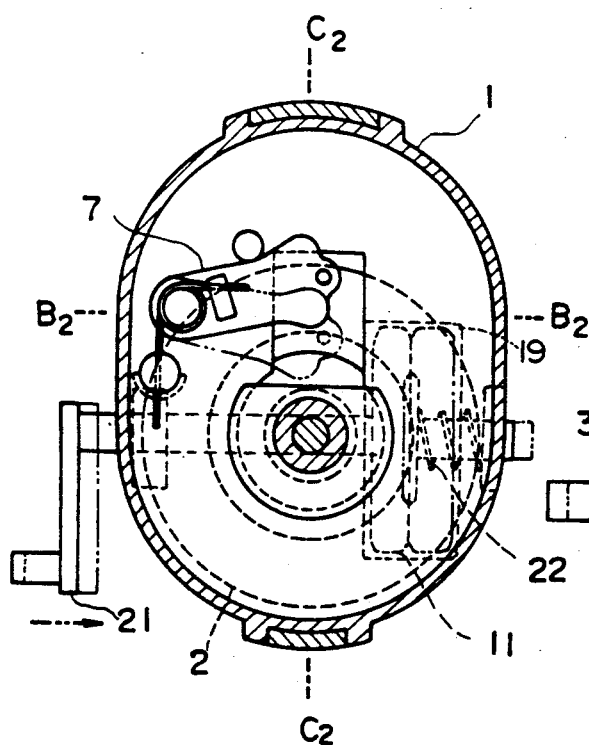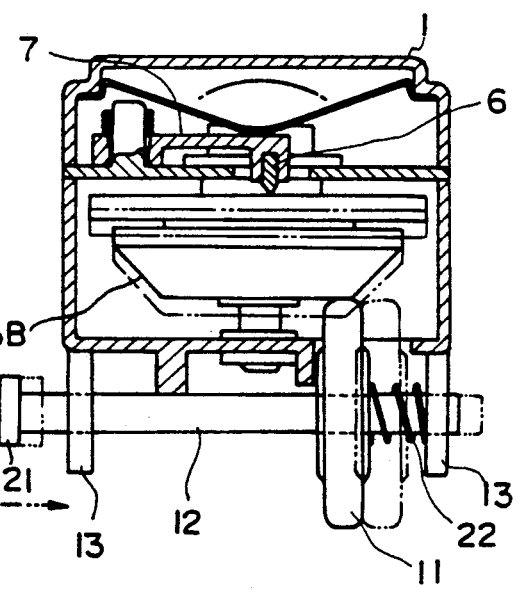

MANUAL SIMPLIFIED ACOUSTIC PLAYBACK APPARATUS

BACKGROUND OF THE INVENTION

1. Field of the Invention:

The present invention relates to a manual simplified playback apparatus to reproduce recorded sounds by rotating a turn table by the action of friction between the turn table and a frictional driving wheel.

2. Description of the Prior Art

In a prior playback apparatus as disclosed in Japanese Utility Model Laid-Open Publication No. 63-29594, a gear mechanism is used to transmit a driving force from a driving shaft to a disk record, and furthermore, a special mechanism such as an operating arm having a cam mechanism is required to release a stylus force applied to the disk record.

In the prior manual simplified playback apparatus, the driving force is transmitting by combining a plurality of gears, and furthermore, the stylus force releasing mechanism is complicated. As a result, a problem arises when noise is generated due to the operation of the gears making it difficult to hear reproduced sounds. Further, the prior apparatus are easily broken due to breakage of the gears or bearings of the gears. In particular, when the apparatus is used as a toy, the operator is a child and rough handling cannot be avoided. Furthermore, since the frequency of use is presumed to be high, a structure having complicated mechanisms is not desirable in terms of durability. Moreover, a manufacturing problem is involved in that when the structure is complicated, assembly is troublesome and a long time is consequently required for production of the apparatus.

SUMMARY OF THE INVENTION

It is an object of the invention to solve the problems in the prior art by providing a simplified mechanism for transmission of a driving force from a driving shaft to a disk record, and release of a stylus force. A further object is to provide a manual sound generator which is hard to break and has superior durability, and which is easy to assemble in mass production.

A manual simplified acoustic playback apparatus in accordance with the present invention comprises a casing containing a turn table unit including a disk record and a turn table slidably and rotatably supported by a center shaft. A stylus for scanning a modulated groove of the disk record is contained in a tone arm biased by a return spring so that the pickup is normally returned to a playback starting point, when the disk and pickup are not engaged. A speaker is provided so as to enable the tone arm to slide thereon, amplifying the demodulated sounds.

A buffer device is included in the turn table at a position between the disk record and the turn table for supporting the disk record elastically on the turn table.

A stylus force and driving mechanism is accommodated in the casing which includes an axle which movably supports a frictional driving wheel movable in a linear and a rotational direction so that when the frictional driving wheel moves in a linear direction the frictional driving wheel pressingly contacts the turn table to push the turn table in the turn table axial direction to bring the stylus into contact with the recording disk. A rotation of the turn table is affected by a rotation of the frictional driving wheel.

In the manual simplified acoustic playback apparatus arranged as described above, when the frictional driving wheel is pushed towards the turn table, the turn table unit is pushed upward towards the pickup to make the disk record abut against the pickup, and a stylus force is applied. At this time, even when the disk record is pushed upward excessively, the buffer device provided between the disk record and the turn table retracts the disk record towards the turn table. As a result, an appropriate stylus force can be maintained. In this condition, when the frictional driving wheel is rotated, this rotation is converted to a rotation of the turn table due to friction between a lower surface of the turn table and a peripheral portion of the frictional driving wheel, and further, this rotation is transmitted to the disk record thereby effecting playback of the disk record. Upon releasing the pushing pressure applied to the turn table by the frictional driving wheel, the engagement of the disk record with the stylus is released, and the playback is completed. The stylus, with the stylus force released, is returned to its playback standby position by the force of a return spring located along the tone arm.

BRIEF DESCRIPTION OF THE DRAWINGS

FIG. 2A is a side sectional view of a second embodiment of the invention;

FIG. 2B is a top sectional view taken along the line A2—A2;

FIG. 2C is a front sectional view taken along the line B2—B2;

DESCRIPTION OF THE PREFERRED EMBODIMENTS

Figure 1A:
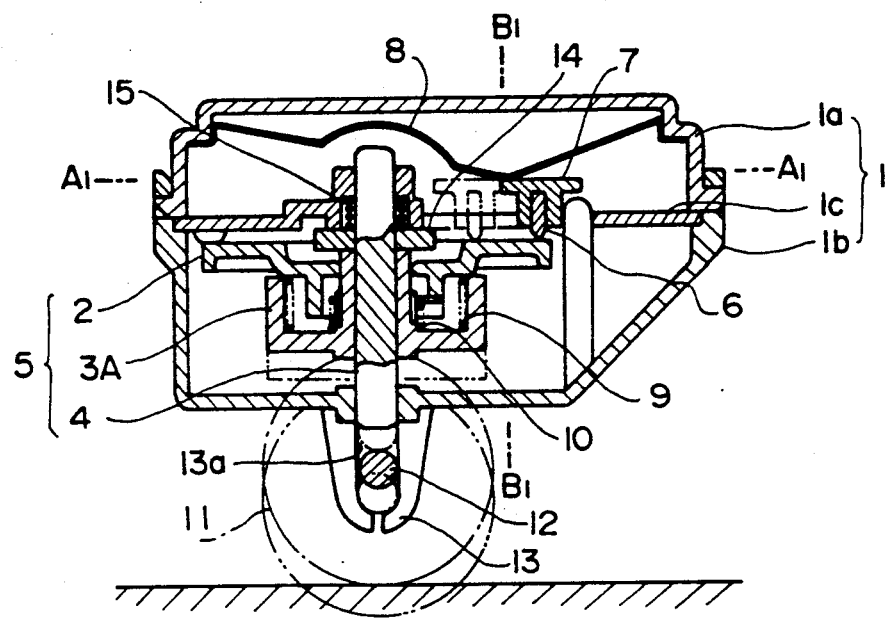
FIG. 1A is a side sectional view of a first embodiment of the invention.
Figure 1B:
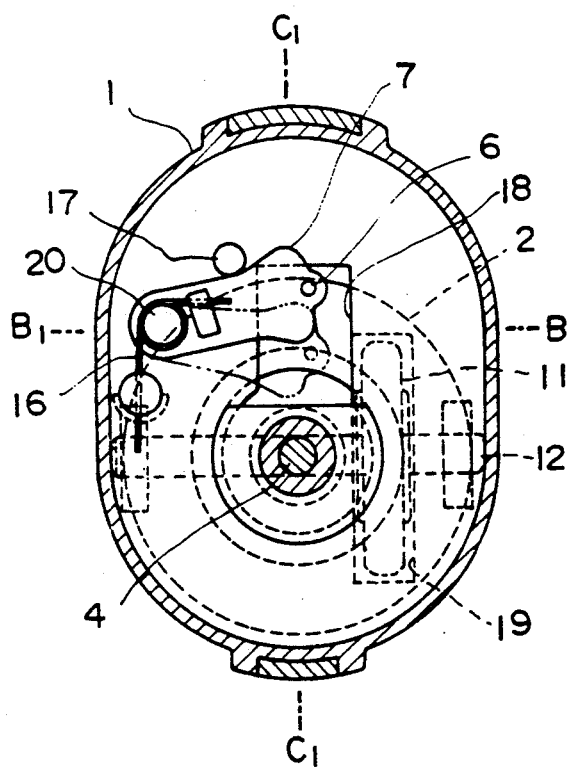
FIG. 1B is a top section view taken along the line A1—A1 in FIG. 1A.
Figure 1C:
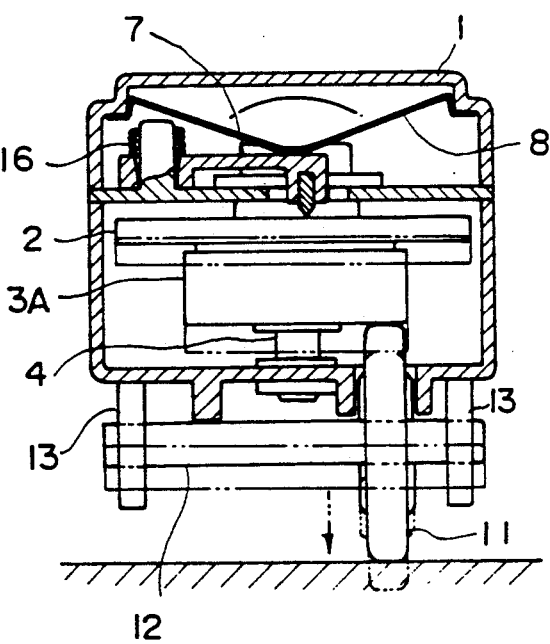
FIG. 1C is a front sectional view taken along the line B1—B1.

FIGS. 1A to 1C show a structure of a first embodiment.

A casing 1 consists of a housing 1a, a chassis 1b, and an inner layer plate 1c.

As shown in FIG. 1A, the chassis 1b is hollow, and a turn table unit 5 including a disk record 2, a turn table 3A, and a center shaft 4 is accommodated in the chassis 1b. The inner layer plate 1c is joined to the chassis 1b to enclose a hollow portion. The inner layer plate 1c and the chassis 1b are respectively formed with bearing holes for supporting the center shaft 4, and hence, the turn table unit 5 is supported by the chassis 1b and the inner layer plate 1c. A distance between these bearing holes is larger than an axial thickness of the turn table 3 and the disk record 2, and thus, the turn table unit 5 is movable in an axial direction within the chassis 1b.

A tone arm 7 is pivotally mounted at its rear end on a support post 20 at the inner layer place 1c. The tone arm 7 carries a stylus 6 a the front end thereof. Furthermore, a tone arm stop 17 protrudes upwardly from the inner layer plate 1c at a point beyond the circumference of the disk record 2. A return spring 16 is affixed to the tone arm 7 and the inner layer plate 1c so as to wind about a tone arm support post 20 at a rear end portion of the tone arm 7. A first or stylus aperture 18 for the stylus is formed in the inner layer plate 1c along the locus of movement of the stylus 6. Thus, when the turn table unit 5 is lifted, the stylus 6 engages an upper surface of the disk record 2 through the stylus aperture 18. A spring 15 is provided between the inner layer plate 1c and the turn table unit 5 to bias the turn table unit 5 downwardly. However, even if this spring 15 is not provided, when the pushing pressure exerted by the frictional driving wheel 11 is released, the turn table unit 5 will be moved downwardly to the bottom of the chassis 1c due to the weight of the turn table 5, per se. Accordingly, a structure which does not provide the spring may be employed.

The housing 1a also has recesses formed therein, allowing the housing 1a to cover the chassis 1b and enclose the inner layer plate 1c and the upper portion of the center shaft 4. A speaker 8 having a part thereof in a truncated cone shape is fitted into the inside of the housing 1a. A horizontal, smooth surface is formed on the cone portion of the speaker 8. When the housing 1a is held on the chassis 1b, the tone arm 7 slidably contacts the smooth surface of the speaker.

A second or drive aperture 19 for the frictional driving wheel is formed in the bottom of the chassis 1b. An axle 12 which carries the frictional driving wheel 11 is supported by bearings 13 so that the axle 12 is orthogonal to the center shaft 4 and drive aperture 19. In this case, the frictional driving wheel 11 faces the drive aperture 19 for the frictional driving wheel 11. The bearings 13 are formed with guide grooves 13a so that the driving shaft 12 is linearly movable towards the turn table 3A. In a condition where the driving shaft 12 is moved to an upper end of the guide grooves 13a, the peripheral portion of the frictional driving wheel 11 engages the bottom surface of the turn table 3A, and furthermore, the turn table unit 5 is thereby pushed upwardly. In this respect, if the peripheral portion of the friction driving wheel 11 and the bottom surface of the turn table 3A are formed by a material having a high coefficient of friction, or coated with such a material, it will be possible to insure the frictional engagement between the two portions more reliably.

As shown in FIG. 1A, the turn table unit 5 consists of the disk record 2, turn table 3A, and center shaft 4. Although the turn table 3A is secured to the center shaft 4, the disk record 2 is not secured to the turn table 3A and to the center shaft 4. In other words, the disk record 2 is supported by the center shaft 4 with a buffer spring 9 and a spring type one-way clutch 10 interposed between the disk record 2 and the turn table 3A. Thus, the disk record 2 is movable axially, and it can rotate independently in a reverse direction to a normal rotation of the turn table 3A and the disk record 2. Furthermore, the disk record 2 and the turn table 3A are in engagement with the center shaft 4 in such a manner that the interval between the disk record 2 and the turn table 3A has a certain free-play. A disk stop 14 prevents the disk record 2 from moving out of the turn table unit 5. In the embodiment of FIG. 1, although a spring is used as the buffer device 9, a rubber member or an air cushion may be used in place of the spring. Furthermore, in the embodiment, although the buffer spring 9 and the spring type one-way clutch 10 for rotation transmission are provided separately, these members may be used commonly. Moreover, by forming a plurality of modulated grooves in the disk record 2, an advantageous effect can be obtained in which the playback is selected at random depending on a relative position between a starting point of a modulated groove and the stylus 6. In the embodiment of FIG. 1, the turn table 3A lateral side is not tapered. However, taking common use of parts into consideration, a turn table of a shape similar to a turn table 3B in FIG. 2 may naturally be used. In addition, the turn table 3A and the center shaft 4 may be formed integrally, if desired.

The operation in the first embodiment will now be described.

First, in order to advance the frictional driving wheel 11 into the inside of the casing 1, the frictional driving wheel 11 is pushed against a floor or the like. Thus, the frictional driving wheel 11 is advanced into the inside of the casing 1 through the driving aperture 19 due to the movement of the driving shaft 12 along the guide grooves 13a of the bearings 13. The peripheral portion of the frictional driving wheel 11 abuts against the bottom surface of the turn table 3A thereby to push the turn table unit 5 upwardly. Thus, the disk record 2 provided on the upper surface of the turn table unit 5 abuts against the stylus 6, and a stylus force is applied. Since the buffer spring 9 is provided on the turn table unit 5, even when the turn table unit 5 is pushed upward excessively, the disk record 2 is retracted downwardly, and an appropriate stylus force is insured. Thus, the surface of the disk record 2, or the stylus tip is not scratched or broken.

Under the condition in which the frictional driving wheel 11 is pushed towards the casing 1 as described above, the manual simplified acoustic playback apparatus is made to travel on the ground or the like to thereby rotate the frictional driving wheel 11. Since the peripheral portion of the frictional driving wheel 11 and the bottom surface of the turn table 3 are in contact with each other, the rotation of the frictional driving wheel 11 is transmitted to the turn table unit 5 due to the friction therebetween. As a result, the disk record 2 is rotated through the spring type one-way clutch 10, and the playback of the recorded sounds is started. However, since the transmission of the rotation from the turn table 3 to the disk record 2 is carried out through the spring type one-way spring 10, so long as the frictional driving wheel 11 is not rotated in the correct direction, the transmission of the rotation is not effected. Thus, the recorded sounds are not reproduced, and the stylus 6 does not travel in the opposite direction. In the embodiment, although the frictional driving wheel 11 is made to travel directly on a plane such as the ground or the like, it is possible to indirectly rotate the frictional driving wheel 11 by rotating wheels (not shown) provided at opposite ends of the driving shaft 12 and having a diameter larger than that of the frictional driving wheel 11.

When the playback is completed, the playback apparatus is raised from the ground to release the application of the pushing pressure. Then, the frictional driving wheel 11 is retracted from the inside of the casing, that is, moves downwardly due to the pushing action of the turn table unit 5 or due to the weight of the frictional driving wheel 11 per se. Furthermore, the turn table unit 5 moves downwardly to the bottom of the chassis 1b due to the biassing by the spring 15, or the weight of the turn table unit 5 per se. At this time, since the level of the disk record 2 is lowered, the stylus force applied between the disk record 2 and the stylus 6 is also released. Once the stylus force is released, the engagement between the stylus 6 and the modulated groove is released, and the stylus 6 and the tone arm 7 return to the playback standby position due to the spring force of the return spring 16.

By repeating the above operation, it is possible to reproduce the recorded sounds any number of times as desired.

FIGS. 2A to 2C show a structure of a second embodiment of the invention.

The structure of a housing 1a and an inner layer plate 1c is the same as the first embodiment.

As shown in FIG. 2C, in this embodiment, a turn table 3B is formed by a disk of truncated cone shape having a tapered peripheral surface. The structure of the turn table unit 5 in other points is the same as the first embodiment.

Furthermore, a chassis 1b has a drive aperture 19 for a frictional driving wheel 11 at a bottom portion of the chassis, similar to the first embodiment. A driving shaft 12 carrying the frictional driving wheel 11 is supported by bearings 13 so that the driving shaft 12 is orthogonal to the center shaft 4 and driver aperture 19. The length of the drive aperture 19 in the axial direction of the driving shaft 12 is made longer than the width of the frictional driving wheel 11 to allow the frictional driving wheel 11 to slide in the axial direction of the driving shaft 12 within the aperture 19. Furthermore, a handle 21 having a grip portion is fixed to one end of the driving shaft 12 distal from the frictional driving wheel 11. A spring 22 for biassing the driving shaft 12 towards the handle 21 is interposed between the frictional driving wheel 11 and that bearing 13 distal from the handle 21. It will be appreciated that if the spring is provided to bias the driving shaft 12 in a direction opposite to the handle 21, then the frictional driving wheel 11 will be normally in a stylus force released condition. Thus, in this case, the stylus force can be applied by drawing (to the left in FIG. 2C) the handle 21. In the embodiment of FIG. 2, although the frictional driving wheel 11 is mounted exposed to the outside of the casing 1, the present invention is not limited to this, and the frictional driving wheel 11 may be enclosed completely within the casing 1.

Next, the operation of the second embodiment will be described.

In a normal condition, the frictional driving wheel 11 is in contact with the bottom surface of the turn table 3B due to the biassing of the spring 22. Thus, the frictional driving wheel 11 is pushing the turn table unit 5 upwardly, and the stylus force is being applied. In this case, when the tone arm 7 is not at the playback standby position, in order to release the stylus force and return the tone arm 7 to the playback standby position, the handle 21 is pushed towards the frictional driving wheel 11 to disengage the frictional driving wheel 11 from the flat bottom surface of the turn table 3B. As a result, the turn table unit 5 is lowered. Then, the stylus 6 is disengaged from the disk record 2, and the tone arm 7 is returned to the playback standby position by a a spring force of the return spring 16. Thereafter, when the pushing of the handle 21 is released, the frictional driving wheel 11 moves automatically towards the handle 21 due to the spring force of the spring 22, and abuts against the turn table 3B. Since the turn table 3B has a tapered peripheral portion, the pushing force of the frictional driving wheel 11 causes the tapered surface to slide upwardly, moving the turn table unit 5 upwardly towards the inner layer plate 1c. In other words, owing to the is structure, the pushing force of axles 12 in its axial direction is converted to a pushing force in a direction perpendicular to the axle 12. As a result, the stylus 6 abuts against the disk record 2, and when the handle 21 is rotated, the disk record 2 is rotated to reproduce the recorded sounds.

Figure 3A:
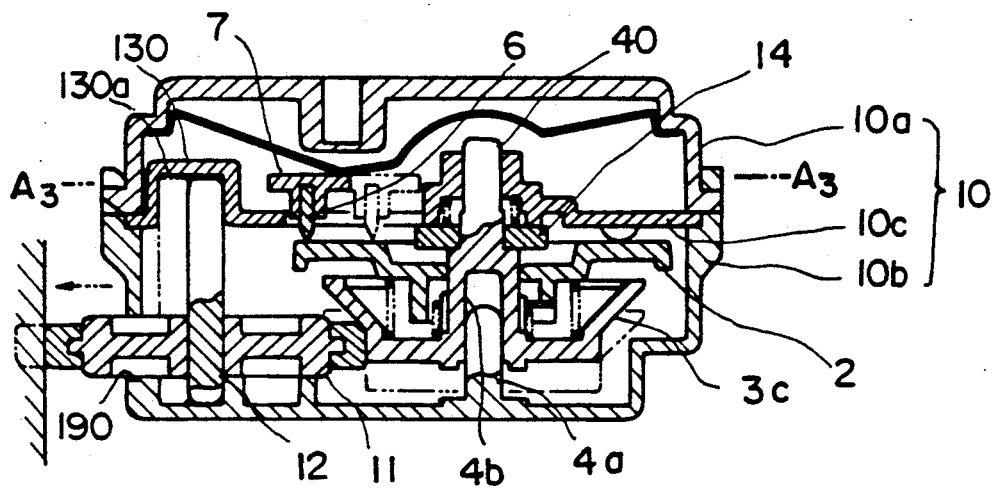
FIG. 3A is a side sectional view of a third embodiment of the invention.
Figure 3B:
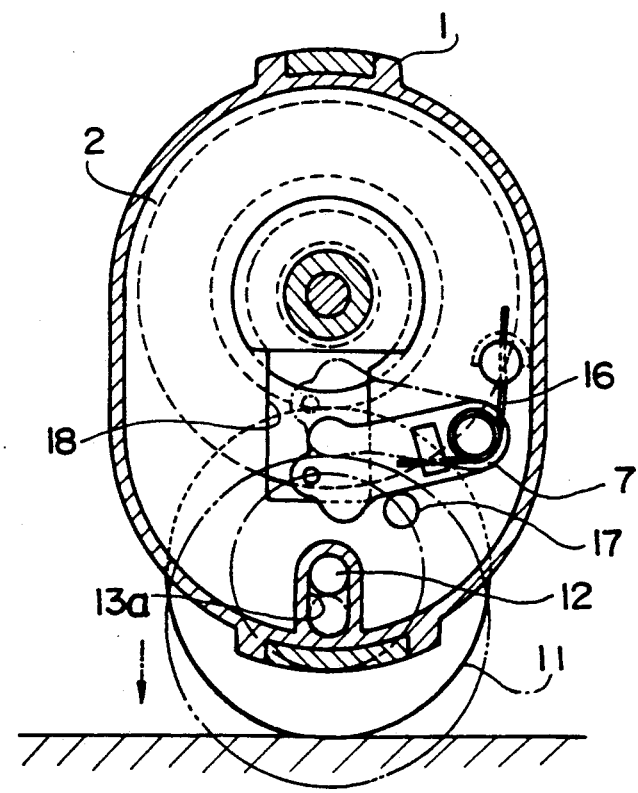
FIG. 3B is a top section view taken along the line A3—A3.

FIGS. 3A and 3B show a third embodiment of the invention.

The structure of a housing 1a and an inner layer plate 1c is similar to that in the first embodiment.

A turn table 3C has a tapered peripheral surface with a contiguous flat surface formed at an oblique angle thereto on a lower part of the turn table 3C. Moreover, the turn table 3C is formed with an integral center shaft 40, and a bore 4b of a predetermined depth is formed in the center shaft 40 from a bottom thereof. A protruding shaft 4a protruding from a chassis 10b is fitted into the hole 4b. The structure of a turn table unit 5 of other portions is similar to the first embodiment.

A driving shaft 12 which carries a frictional driving wheel 11 is supported by a bearing 130 provided inside a casing 10 in parallel to the axial direction of the center shaft 40. The bearing 130 has a guide groove 130a so as to enable the driving shaft 12 to move in a diametral direction of the turn table 3C. Furthermore, an aperture 190 is formed in the chassis 10b to allow the frictional driving wheel 11 to be exposed to the outside of the casing 10.

Next, the operation of the third embodiment will be described.

The frictional driving wheel 11 is pushed against a floor or the like so that the frictional driving wheel 11 and the axle 12 advance towards the turn table 3C. The driving shaft 12 carrying the frictional driving wheel 11 is moved along the guide groove 130A of the bearing 130 upwardly (in FIG. 3B). As a result, the frictional driving wheel 11 abuts against the tapered peripheral surface of the turn table 3C to make the tapered surface slide upwardly thereby to push the turn table unit 5 upwardly. As a result, the disk record 2 provided on the turn table unit 5 abuts against a stylus 6, and a stylus force is applied. At the same time, the frictional driving wheel 11 contacts closely the contiguous flat surface of the turn table 3C and both members are engaged frictionally with each other.

The operation following to this is similar to the first embodiment.

As described in the foregoing, in the present invention, the transmission of the rotational driving force to the disk record is effected in a simple way such as frictional engagement. Therefore, it is possible to provide a manual simplified acoustic playback apparatus which is not easily broken and in which the operating sound or background noise is quiet.

Furthermore, since the driving force transmission mechanism in the present invention includes only a frictional driving wheel and a turn table unit, the longevity of the manual simplified acoustic playback apparatus is excellent.

Having, thus, described the invention, what is claimed is:

1. A manual acoustic playback apparatus, comprising:
   (a) a casing comprising:
      (1) a housing having a recess formed therein,
      (2) a chassis having a recess formed therein, the housing and chassis being joined so as to form a central cavity,
      (3) an inner layer plate fixedly located between the housing and the chassis so as to divide the central cavity into two chambers, the inner plate having an aperture formed therein, (b) a turn table unit disposed within the casing, the turn table unit comprising:

(1) a center shaft affixed to said chassis and extending into the central cavity, (2) a turn table slidably and rotatably supported on the center shaft within the central cavity so as to have a stylus engaging position and a stylus non-engaging position, and (3) a sound recording disk overlaying and supported by the turn table, the recording disk having a modulated groove therein, (c) means for driving the turn table;

(d) means for urging the turn table into contact with a stylus;

(e) means for sound reproduction comprising:

(1) a stylus, held by a tone arm, for demodulating sounds from the modulated groove within the sound recording disk, (2) a tone arm, the tone arm being pivotally mounted to the inner layer plate so as to permit the stylus to move through the inner plate aperture when the stylus is in contact with the modulated groove of the record disk; and (3) a speaker for amplification and transmission of demodulated sounds from the recording disk, the speaker being in physical contact with the tone arm when the recording disk is demodulated, the speaker being attached to the housing; and (f) a biasing spring for biasing the turn table and sound recording disk away from the stylus.

2. The playback apparatus according to claim 1 wherein:

the center shaft has a first end disposed proximate the turn table, and a second end fixedly mounted to the casing, the inner layer plate having an aperture formed therein for securely holding the first end portion of the center shaft within the cavity.

3. The playback apparatus according to claim 1 further comprising:

a disk stop platform fixedly located between the inner layer plate and the sound recording disk for limiting the movement of the sound recording disk towards the stylus.

4. The playback apparatus of claim 1 further comprising:

a one-way clutch for limiting the rotational movement of the turn table to a single rotational direction.

5. The playback apparatus of claim 4 wherein; the one-way clutch comprises the biasing spring.

6. The playback apparatus according to claim 1 wherein the means for urging the turn table into contact with the stylus comprises:

(a) at least one axle bearing fixedly attached to the casing, the axle bearings having grooves formed thereon, the long axis thereof intersecting a plane face of the turn table, said grooves having a near end and a far end;

(b) an axle retained by at least one axle bearing and being linearly movable within the axle bearing grooves between the near end and far end of the bearing grooves, the axle being rotatable within the grooves;

(c) a frictional drive wheel fixedly mounted on the axle, the drive wheel having a diameter of a size capable of urging the turn table into a stylus engaging position by physical contact therewith when the axle is located in the near end of the bearing grooves.

7. The playback apparatus according to claim 6 wherein:

the frictional drive wheel frictionally abuts a surface of the turn table such that when the drive wheel and axle are rotated, rotational motion is transmitted to the turn table to provide for driving the turn table.

8. The playback apparatus according to claim 7 further comprising:

a handle attached to the axle whereby turning of the handle imparts a rotational motion to the axle.

9. The playback apparatus according to claim 8 wherein:

the frictional driving wheel is enclosed entirely within the casing.

10. The playback apparatus according to claim 1 comprising:

a second biassing spring further disposed on the tone arm for normally biassing the tone arm to the beginning of the sound recording disk.

11. The playback apparatus according to claim 8 wherein the inner layer plate further comprises a means for anchoring the biassing spring.

12. The playback apparatus according to claim 11 wherein the inner layer plate further comprises:

means for limiting the movement of the tone arm in the direction of the biassing spring.

13. The playback apparatus according to claim 1 further comprising:

a wheel, of larger diameter than the frictional drive wheel, attached to the axle for driving the axle.

14. The playback apparatus according to claim 1 further comprising:

a buffer means located within the turn table unit at a position between the disk record and the turn table for elastically supporting the disk record on the turn table.

15. The playback apparatus according to claim 14 wherein:

the buffer means is comprised of at least one member selected from the group consisting of a spring, a rubber member, and an air cushion.

16. The playback apparatus according to claim 4 wherein:

the one-way clutch further comprises a buffer means for elastically supporting the disk record on the turn table.

* * * * *